United States Patent [19]
Blake et al.

[11] Patent Number: 5,227,600
[45] Date of Patent: Jul. 13, 1993

[54] MICROWAVE SINTERING OF MULTIPLE ARTICLES

[75] Inventors: Rodger D. Blake, Santa Fe; Joel D. Katz, Los Alamos, both of N. Mex.

[73] Assignee: The United States of America as represented by the United States Department of Energy, Washington, D.C.

[21] Appl. No.: 923,298

[22] Filed: Jul. 31, 1992

[51] Int. Cl.[5] .................... H05B 6/80; C04B 33/32
[52] U.S. Cl. .................... 219/10.55 M; 219/10.55 R; 264/26; 425/174.8 R
[58] Field of Search ............... 219/10.55 R, 10.55 M, 219/10.55 F, 10.55 E; 264/25, 26; 425/174, 174.8 R, 174.8 E

[56] References Cited

U.S. PATENT DOCUMENTS

| | | | |
|---|---|---|---|
| 3,900,542 | 8/1975 | Palmour et al. | 264/40 |
| 4,147,911 | 4/1979 | Nishitani | 219/10.55 M |
| 4,307,277 | 12/1981 | Maeda et al. | 219/10.55 R |
| 4,354,991 | 10/1982 | Suzuki et al. | 264/65 |
| 4,505,787 | 3/1985 | Fuller et al. | 204/67 |
| 4,541,729 | 9/1985 | Schubring | 374/31 |
| 4,695,695 | 9/1987 | Meek et al. | 219/10.55 M |
| 4,771,153 | 9/1988 | Fukushima et al. | 219/10.55 B |
| 4,963,709 | 10/1990 | Kimrey, Jr. | 219/10.55 M |
| 5,164,130 | 11/1992 | Holcombe et al. | 264/26 |
| 5,191,183 | 3/1993 | Balbaa et al. | 219/10.55 M |

OTHER PUBLICATIONS

"Microwave Sintering Alumina Spark Plug Insulators," Amer. Ceramic Soc., Electronics Division Fall Meeting Sep. 11-14, 1983, Norman W. Schubring.
"Microwave Firing of High Alumina Castables," Mat. Res. Soc. Symp. Proc., vol. 124 (1988), Willard H. Sutton.
"Microwave Sintering of Multiple Alumina and Composite Components," Ceramic Bulletin, vol. 70, No. 8 (1991), Joel D. Katz et al.
"The Properties of Alumina Sintered in a 2.45 GHz Microwave Field," Mat. Res. Soc. Symp. Proc., vol. 189 (1991), Mark C. L. Patterson et al.
"Microwave Sintering of $Al_2O_3$ and $Al_2O_3$-SiC Whisker Composites," Ceram. Eng. Soc. Proc., 8 (7-8), pp. 861-871 (1987), T. T. Meek et al.
"Microwave Sintering of Alumina-Silicon Carbide composites at 2.45 and 60 GHz," Ceram. Eng. Sci. Proc., 9 (7-8), pp.725-734 (1988).

Primary Examiner—Philip H. Leung
Attorney, Agent, or Firm—Richard J. Cordovano; Paul D. Gaetjens; William R. Moser

[57] ABSTRACT

Apparatus and method for producing articles of alumina and of alumina and silicon carbide in which the articles are sintered at high temperatures using microwave radiation. The articles are placed in a sintering container which is placed in a microwave cavity for heating. The rates at which heating and cooling take place is controlled.

6 Claims, 2 Drawing Sheets

MICROWAVE SINTERING OF MULTIPLE ARTICLES

BACKGROUND OF THE INVENTION

This invention relates to materials science and, more particularly, to processing of materials using microwave radiation for heating the materials. This invention is the result of a contract with the Department of Energy (Contract No. W-7405-ENG-36).

It currently requires many hours to produce densified articles of alumina and of alumina and silicon carbide using conventional heat sources. Single articles of relatively small mass have been sintered using microwave radiation. However, prior to the present invention, it has not been possible to densify by microwave sintering multiple articles of these materials having larger mass. Difficulties experienced have included cracking of the articles, inability to reach sintering temperatures when using only alumina insulation, melting of alumina insulation, and inability to control rate of heating when using zirconia insulation.

SUMMARY OF THE INVENTION

This invention is apparatus and method for producing articles of alumina and of alumina and silicon carbide in which the articles are sintered at high temperatures using microwave radiation. The articles are placed in a sintering container which is placed in a microwave cavity for heating. The rates at which heating and cooling take place is controlled.

DETAILED DESCRIPTION OF THE INVENTION

This invention is described in a paper entitled "Microwave Sintering of Multiple Alumina and Composite Components" by Katz and Blake which appeared in the American Ceramic Society Bulletin, vol. 70, no. 8 (August 1991). This paper is hereby incorporated in full into this patent application.

Figure 2:
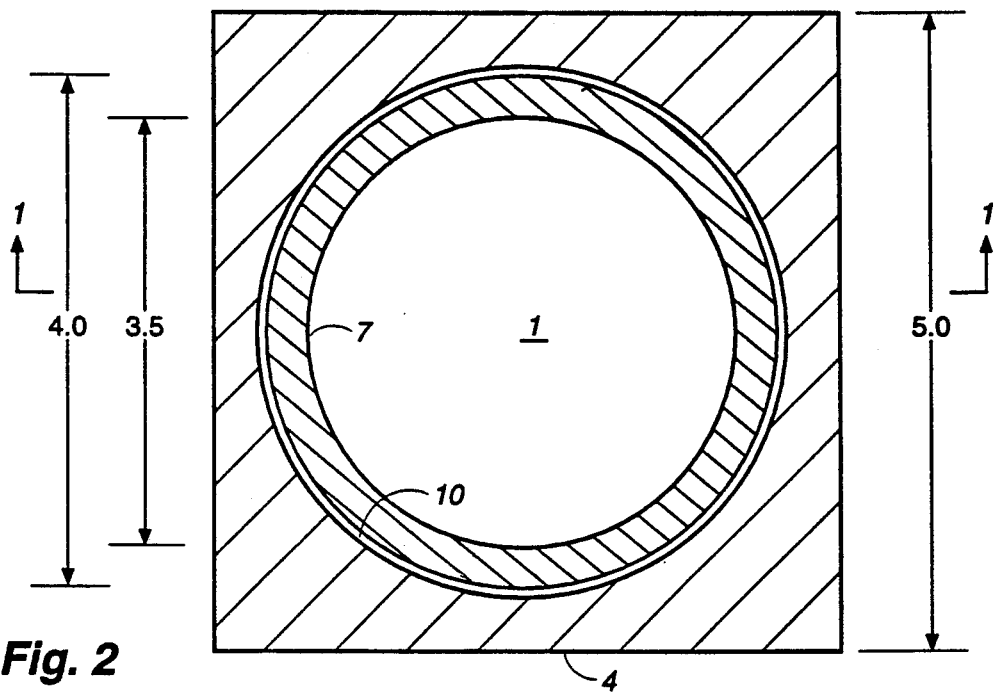
FIG. 2 is a sectional plan view of the sintering container of FIG. 1.
Figure 1:
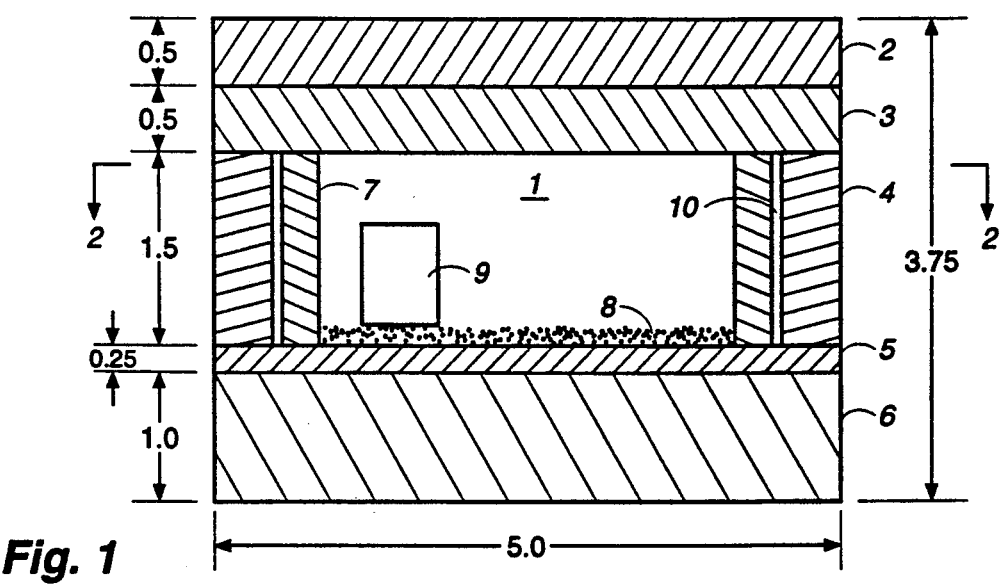
FIG. 1 depicts a microwave sintering container for use in sintering alumina articles in sectional side view.

FIGS. 1 and 2 depict a container which was used in experimentation in sintering alumina articles. Both are section views which are taken as shown by the section arrows on each drawing. The alumina sintering container has a base layer 6 of insulating material upon which rests a layer 5 of zirconia which serves as insulation and as a susceptor of microwave radiation. A hollow cylindrical ring 7 of insulating material defines the sidewall of sintering chamber 1. The upper surface of zirconia layer 5 is the floor of sintering chamber 1. A layer of alumina particles 8 is located on floor layer 5. The articles of alumina which are sintered rest upon particles 8. For drawing convenience, only one alumina article 9 is shown in FIG. 1 and none are shown in FIG. 2. Zirconia element 4 surrounds ring 7 and has a square planform, as can be seen in FIG. 2. A circular planform may also be used for zirconia element 4. There is a small gap 10 between ring 7 and element 4 in order to facilitate assembly of the sintering container and prevent reactions between dissimilar materials. The ceiling of chamber 1 is formed by ceiling layer 3 of insulating material and top layer 2 of zirconia rests upon ceiling insulating layer 3.

FIGS. 1 and 2 show the dimensions, in inches, of the container used in the experimentation. Base layer 6 is 1.0 inch thick and vertical thickness may range from about 0.5 to about 2.0 inches. Zirconia floor layer 5 is 0.25 inch thick and vertical thickness may range from about 0.125 to about 0.25 inch. Ring 7 is 0.25 inch thick and horizontal thickness may range from about 0.125 to about 0.375 inch. The outside diameter of the ring in the experimental container is 4.0 inches and the inside diameter is 3.5 inches. The planform of the container is square with the length of a side being 5 inches. The horizontal thickness of zirconia element 4, which surrounds ring 7, may range from about 0.25 to about 2.5 inches. A circular container planform may be used, in which case the horizontal thickness of zirconia element 4 would be uniform. Ceiling layer 3 is 0.5 inches thick and vertical thickness may range from about 0.25 to about 1.5 inches. Top zirconia layer 2 is 0.5 inch thick and vertical thickness may range from about 0.25 to about 1.5 inches. The height of the sintering chamber is determined by the height of the articles to be sintered.

Twenty articles were placed in sintering chamber 1 and the container was heated in air in a microwave cavity using microwave radiation having a frequency of 2.45 GHz. Microwave power was provided to the cavity from a 6 kilowatt variable power microwave generator via a waveguide. The container was placed on a table which could be raised or lowered within the cavity. Each article was made by unaxial pressing of alumina powder obtained from Sumitomo Chemical Company of Osaka, Japan (grade AKP-50) at about 1000 psi followed by isostatic pressing at about 50,000 psi. The articles were right circular cylinders having a diameter of about 0.595 inch, a height of about 1.25 inches, and a weight of about 12.5 grams (please note that the dimensions in the above-incorporated paper are reversed). It is expected that the present invention will be useful in sintering two or more articles at one time where each has a mass of up to about 50 grams. The sintering chamber must be reasonably consonant in size with the number of articles to be sintered; that is, for example, 2 articles should not be sintered in a chamber which will hold 20 articles. The density of the articles before sintering was about 55% of theoretical density. The articles were heated to a temperature of about 1600° C. and held at that temperature for about 10 minutes. The rate of heating was maintained at a value less than about 48° C. per minute, as other experimentation had shown that heating at a greater rate caused cracking of the articles. It is expected that the hold temperature may be varied within a range of from about 1400° to about 1700°0 C. and the time for which the temperature is maintained within the hold temperature range may be from about 5 to about 60 minutes. The microwave power level was reduced to maintain the articles at the hold temperature. Temperature was measured by means of an optical fiber thermometer inserted through a small horizontal channel drilled through zirconia element 4 and ring 7 (not shown on the drawings), so that the temperature of the surface of one of the articles is measured. The temperature measuring equipment does not measure temperatures below about 500° C.; however, it is believed that the rate of heating below 500° C. is less than 48° C. per minute. After the hold period, temperature was slowly lowered to about 1350° C. by reducing the microwave power, at which point the power was turned off and the articles allowed to cool at a rate determined by the physical surroundings. It is believed that the maximum cooling rate should be no more than about 30° C. per minute in order to avoid cracking of the articles. It should be noted that the rate of cooling is established in part by the design of the sintering container, as the insulation material and the zirconia, which also functions as insulation, slow the rate of cooling. Theoretical density of sintered alumina articles was about 98 to 99% of theoretical density and the dimensions were about 0.5 inch diameter and about 1.025 inch high. The microstructure of sintered alumina articles was quite uniform, having only isolated porosity, and grain size did not vary with location in an article. The grain size was about 5 to 50 microns. Of 320 articles sintered in 20 article batches, none showed visible cracks and three were rejected because of the effects of reaction with the insulating material.

The insulating material used in the experimentation was Type SALI alumina insulation from Zircar Products, Inc. of Florida, NY, which the manufacturer specifies as having a composition of about 80 wt% of $Al_2O_3$ and about 20 wt% $SiO_2$ and a density of about 0.48 gram per cubic centimeter. Other materials which are suitable for high temperature use and have sufficiently low thermal conductivity to provide an insulating function may be used; examples of such materials are magnesium oxide, boron nitride, and yttrium oxide. Another requirement for an insulating material is that it be relatively transparent to microwaves, so that it does not heat to any significant degree when subjected to microwave radiation. Alumina increasingly suscepts microwaves as its temperature increases, with significant heating starting at about 1000° C. However, the high porosity of the alumina insulation used results in its functioning primarily as an insulator. The zirconia used in the experimentation was Zircar Type 2YFB3, which is stabilized with about 8 wt% of $Y_2O_3$, has a density of about 0.48 gram per cubic centimeter, and has a porosity of about 92%. As pure zirconia does not couple well to microwave radiation, use of partially stabilized or fully stabilized zirconia is necessary to the practice of the invention, as these materials do couple well. The alumina particles used on the floor of the sintering container are known as 60 mesh alumina grain.

Figure 3:
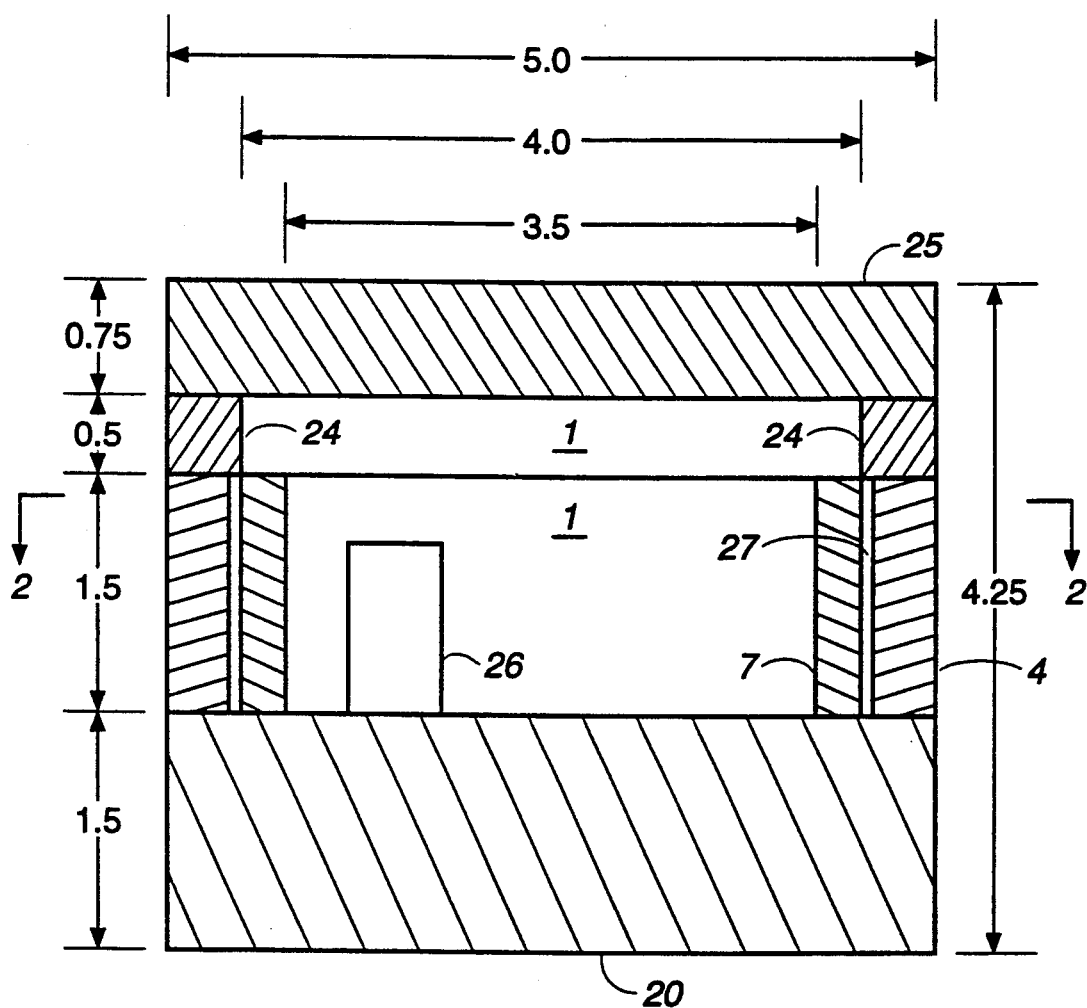
FIG. 3 depicts a microwave sintering container for use in sintering articles of alumina and silicon carbide in sectional side view.

FIG. 3 depicts a container which was used in experimentation in sintering articles of alumina and silicon carbide, where each article consisted of 95 wt% alumina and 5 wt% SiC. It is expected that this type of container will be useful in sintering articles of alumina and SiC where the amount of SiC in the article is from about 1.0 to about 30 wt%. FIG. 3 is a section view taken in the same manner as FIG. 1. The section arrows of FIG. 3 indicate that the container of FIG. 3 may be depicted in a section view which is identical to FIG. 2 (except for the reference numbers of FIG. 2). The sintering container for alumina-SiC composite articles has a base layer 20 of insulating material whose upper surface is the floor of sintering chamber 1. A hollow cylindrical ring 7 of insulating material defines the sidewall of sintering chamber 1. For drawing convenience, only one composite article 26 is shown in FIG. 3. Zirconia element 4 surrounds ring 7 and has a square planform, as can be seen in FIG. 2. A circular planform may also be used for zirconia element 4. There is a small gap 27 between ring 7 and element 4 in order to facilitate assembly of the sintering container and prevent reactions between dissimilar materials. The ceiling of chamber 1 is the bottom surface of ceiling layer 25 of insulating material. Spacing element 24 of insulating material rests on zirconia element 4 and surrounds the top portion of chamber 1. The spacing element of FIG. 3 consists of four strips of insulating material having a cross-section of 0.5 inch by 0.5 inch. When a container having a circular planform is used, its spacing element would be in the form of a ring having an outside diameter the same as the container.

FIG. 3 shows the dimensions, in inches, of the container used in the experimentation with composite articles. Base insulating layer 20 is 1.5 inches thick and vertical thickness may range from about 1.0 to about 2.5 inches. Ring 7 is 0.25 inch thick and horizontal thickness may range from about 0.125 to about 0.375 inch. The outside diameter of the ring used in the experimental container is 4.0 inches and the inside diameter is 3.5 inches. The planform of the container is square with the length of a side being 5.0 inches. The horizontal thickness of zirconia element 4, which surrounds ring 7, may range from about 0.25 to about 2.5 inches. A circular container planform may be used, in which case the thickness of zirconia element 4 would be uniform. Ceiling layer 25 is 0.75 inches thick and vertical thickness may range from about 0.5 to about 2.0 inches.

Experimentation using the composite article container was conducted in the same manner as that using the alumina article container. Two pressing steps were done in the same manner. Twenty article batches were sintered using the same equipment. The composite articles were the same size and weight as the alumina articles and the same hold temperature was used. The hold period for the composite articles was 20 minutes instead of 10 minutes. The hold time range, hold temperature range, maximum heating rate, maximum weight, and maximum cooling rate are expected to be the same for the composite articles as for the alumina articles. The same alumina powder was used for the composite articles. The SiC was in platelet form, was 10 to 10,000 microns in diameter and 1 to 10 microns thick, was in the alpha form, and was obtained from American Matrix, Inc. of Knoxville, TN. The alumina powder and platelets were mixed for one hour in a glass baffle jar on a rolling mill before pressing. The statements above in regard to type of insulating material and zirconia apply to the composite article container. Theoretical densities of sintered alumina-SiC composites were about 96%. The microstructure was uniform with some porosity at matrix-platelet interfaces. The platelets were reasonably well-distributed with few areas of agglomerations. Four of 340 articles which were sintered in 20 article batches had visible cracks. As with the alumina articles, the dimensions of sintered composite articles varied hardly at all.

Development of the inventive sintering containers required a substantial amount of experimentation. It was possible to microwave sinter alumina and alumina-SiC right circular cylinders having starting dimensions of 1 cm by 1 cm using only alumina insulation material and also using only zirconia insulation. Initially, even single articles of the larger dimensions (0.595 inch diameter by 1.25 inches high) could not be sintered due to the difficulties mentioned above. Examples of failed experiments in sintering alumina articles are as follows. An article cracked when sintered in an all zirconia container which was 2.5 inches square and 4.5 inches high with a sintering chamber of 0.875 inch diameter and 1.5 inches high. An all alumina container and chamber of the same dimensions where thin zirconia disks having the same diameter as the article were placed on top of and on the bottom of the article failed to provide an intact sintered article. Another failed experiment utilized a container with the same exterior dimensions which was zirconia except for a circular ring of alumina insulation material having an inside diameter of 0.75 inch and a wall thickness of 0.3125 inch and a height of 1.5 inches, where the ring defined the sintering chamber. The article rested on a 0.25 inch thick layer of alumina particulate on the floor of the chamber. A 2.5 inch square planform container having a 1.5 inch thick zirconia base layer, a 1.5 inch thick alumina insulation ceiling layer, a 0.75 inch inside diameter by 0.1875 inch thick by 1.5 inch high circular ring of alumina insulation, and a surrounding zirconia element having an inside diameter of 1.25 inches did not work. In a failed experiment with the composite articles, a container as described in the previous sentence worked for one composite article but the configuration could not be scaled up for use with more than one composite article. A container holding seven alumina articles was tried. It was 3.75 inches square with a 1.5 inch thick alumina insulation base layer and ceiling layer. A 1.5 inch high circular ring of alumina insulation having an outside diameter of 2 inches and a 0.1875 inch thick wall was surrounded by a zirconia element. Melting of the ceiling layer took place. Another seven article container having the same configuration except that a 0.25 inch thick layer of zirconia was added just above the ring also suffered from melting of the alumina insulation.

It should be noted that the invention is not limited to containers assembled of separate components in the manner of the experimental containers, but that, for example, a container may consist of only two separate pieces.

What is claimed is:

1. A method for microwave sintering of multiple small articles of alumina comprising:
   a. placing at least two articles of alumina in a sintering chamber located within a sintering container, where each article has a mass of no more than about 50 grams, where said chamber is cylindrical in shape, has a floor, a ceiling, and a sidewall, and has a bed of alumina particles located on said floor, where said container has a square or circular planform, where the container is constructed of insulating material and stabilized zirconia, and where the container is comprised of:
   (1) a base layer of insulating material having a thickness of from about 0.5 to 2.0 inches;
   (2) a floor layer of stabilized zirconia having a thickness of from about 0.125 to about 0.25 inch, where said zirconia floor layer rests upon said base layer and where the top surface of the zirconia floor layer is the floor of the chamber;
   (3) a cylindrical ring of insulating material having a horizontal thickness of from about 0.125 to about 0.375 inch, where said ring rests upon the floor layer and where the inner surface of the ring is the sidewall of the chamber;
   (4) a stabilized zirconia element which surrounds the ring and has a horizontal thickness of from about 0.25 to about 2.5 inches;
   (5) a ceiling layer of insulating material having a thickness of from about 0.25 to about 1.5 inches, where said ceiling layer rests upon the ring and said zirconia element and where the bottom surface of the ceiling layer of insulating material is the ceiling of the chamber; and
   (6) a top layer of stabilized zirconia which has a thickness of from about 0.25 to about 1.5 inches and which rests upon the ceiling layer of insulating material;
   b. heating the container to a hold temperature within a hold temperature range by subjecting the container to microwave radiation, where the rate of heating is no more than about 48° C. per minute, where said hold temperature range is from about 1400° to about 1700° C., and where said hold temperature is the surface temperature of one of said alumina articles;
   c. maintaining the sintering container at a temperature within the hold temperature range for from about 5 to about 60 minutes by means of microwave radiation; and
   d. cooling the container to a temperature below about 1350° C. at a maximum rate of no more than 30° C. per minute, where said cooling rate is maintained below said maximum rate by subjecting the container to microwave radiation.

2. The method of claim 1 where said microwave radiation has a frequency of 2.45 GHz.

3. A method for microwave sintering of multiple small articles of alumina and silicon carbide comprising:
   a. placing at least two articles of alumina and silicon carbide in a sintering chamber located within a sintering container, where each article has a mass of no more than about 50 grams, where the amount of silicon carbide in an article is from about 1 to about 30 wt%, where said chamber is cylindrical in shape and has a floor, a ceiling, and a sidewall, where said container has a square or circular planform, where the container is constructed of insulating material and stabilized zirconia, and where the container is comprised of:
   (1) a base layer of insulating material having a thickness of from about 1.0 to about 2.5 inches, where the top surface of said base layer is the floor of the chamber;
   (2) a cylindrical ring of insulating material having a horizontal thickness of from about 0.125 to about 0.375 inch, where said ring rests upon the base layer and where the inner surface of the ring is the sidewall of the chamber;
   (3) a stabilized zirconia element which surrounds said ring and has a horizontal thickness of from about 0.25 to about 2.5 inches;
   (4) a ceiling layer of insulating material having a thickness of from about 0.5 to about 2 inches, where said ceiling layer is located above the ring and said zirconia element and where the bottom surface of the ceiling layer is the ceiling of the chamber; and
   (5) a spacing element of insulating material which completely surrounds a top portion of the chamber and which spaces said ceiling layer of insulating material above said ring by from about 0.25 to about 1.5 inches;
   b. heating the container to a hold temperature within a hold temperature range by subjecting the container to microwave radiation, where the rate of heating is no more than about 48° C. per minute, where said hold temperature range is from about 1400° to about 1700° C., and where said hold temperature is the surface temperature of one of said articles;

c. maintaining the sintering container at a temperature within the hold temperature range for from about 5 to about 60 minutes by means of microwave radiation; and d. cooling the container to a temperature below about 1350° C. at a maximum rate of no more than 30° C. per minute, where said cooling rate is maintained below said maximum rate by subjecting the container to microwave radiation.

4. The method of claim 3 were said microwave radiation has a frequency of 2.45 GHz.

5. Apparatus for microwave sintering of multiple small articles of alumina comprising a sintering container having a sintering chamber located within it, where each article has a mass of no more than about 50 grams, where said chamber is cylindrical in shape, has a floor, a ceiling, and a sidewall, and has a bed of alumina particles located on said floor, where said container has a square or circular planform, where the container is constructed of insulating material and stabilized zirconia, and where the container is comprised of:

a. a base layer of insulating material having a thickness of from about 0.5 to 2.0 inches;

b. a floor layer of stabilized zirconia having a thickness of from about 0.125 to about 0.25 inch, where said zirconia floor layer rests upon said base layer and where the top surface of the zirconia floor layer is the floor of the chamber;

c. a cylindrical ring of insulating material having a horizontal thickness of from about 0.125 to about 0.375 inch, where said ring rests upon the floor layer and where the inner surface of the ring is the sidewall of the chamber;

d. a stabilized zirconia element which surrounds said ring and has a horizontal thickness of from about 0.25 to about 2.5 inches;

e. a ceiling layer of insulating material having a thickness of from about 0.25 to about 1.5 inches, where said ceiling layer is located above the ring and said zirconia element and where the bottom surface of the ceiling layer of insulating material is the ceiling of the chamber; and f. a top layer of stabilized zirconia which has a thickness of from about 0.25 to about 1.5 inches and which rests upon the ceiling layer of insulating material.

6. Apparatus for microwave sintering of multiple small articles of alumina and silicon carbide comprising a sintering container having a sintering chamber located within it, where the amount of silicon carbide in an article is from about 1 to about 30 wt%, where said chamber is cylindrical in shape and has a floor, a ceiling, and a sidewall, where said container has a square or circular planform, where the container is constructed of insulating material and stabilized zirconia, and where the container is comprised of:

a. a base layer of insulating material having a thickness of from about 1.0 to about 2.5 inches, where the top surface of said base layer is the floor of the chamber;

b. a cylindrical ring of insulating material having a horizontal thickness of from about 0.125 to about 0.375 inch, where said ring rests upon the base layer and where the inner surface of the ring is the sidewall of the chamber;

c. a stabilized zirconia element which surrounds said ring and has a horizontal thickness of from about 0.25 to about 2.5 inches;

d. a ceiling layer of insulating material having a thickness of from about 0.5 to about 2 inches, where said ceiling layer rests upon the ring and said zirconia element and where the bottom surface of the ceiling layer is the ceiling of the chamber; and e. a spacing element of insulating material which completely surrounds a top portion of the chamber and which spaces said ceiling layer of insulating material above said ring by from about 0.25 to about 1.5 inches.

* * * * *